O. H. KARCHER.
BALL BEARING.
APPLICATION FILED JAN. 19, 1909.
937,153.
Patented Oct. 19, 1909.
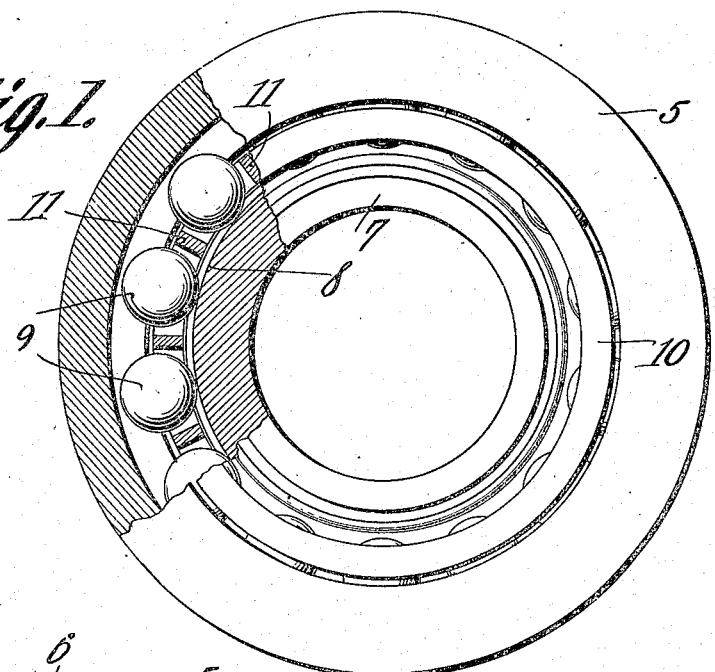
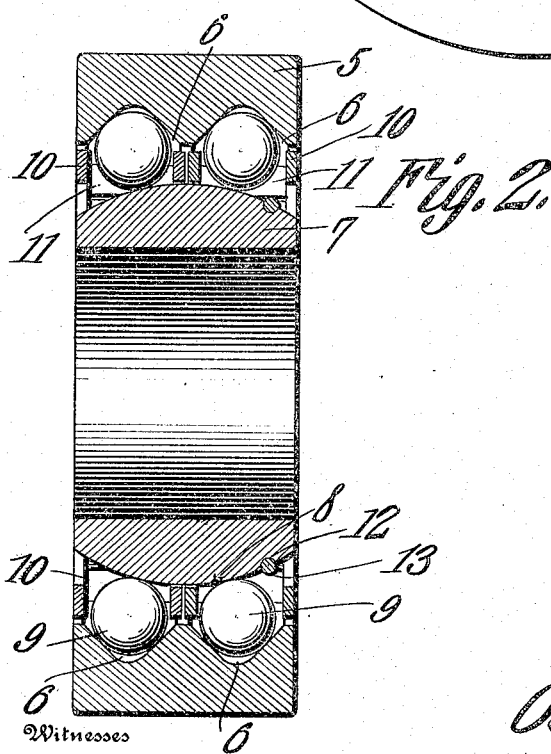
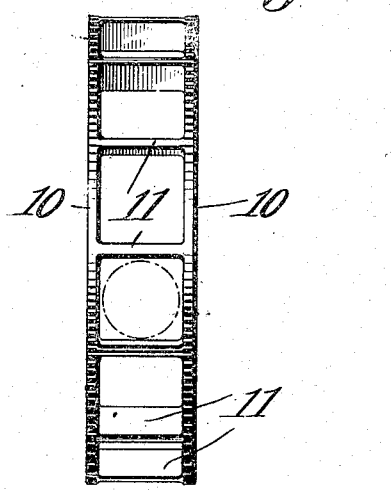
Inventor
Oscar H. Karcher

UNITED STATES PATENT OFFICE.

OSCAR H. KARCHER, OF LANSING, MICHIGAN.

BALL-BEARING.

937,153.     Specification of Letters Patent.     Patented Oct. 19, 1909.

Application filed January 19, 1909. Serial No. 473,163.

*To all whom it may concern:*

Be it known that I, OSCAR H. KARCHER, a citizen of the United States, residing at Lansing, in the county of Ingham and State of Michigan, have invented a new and useful Ball-Bearing, of which the following is a specification.

It is the object of the present invention to improve generally the construction of shaft bearings of that class embodying anti-friction devices, and the primary object of the invention and the prime feature thereof resides in so arranging and constructing the parts of the bearing that the shaft supported thereby may rotate freely and without binding even though it be slightly out of alinement with the axis of the bearing.

The bearing embodying the invention is universal in its application inasmuch as it may be used in a number of different ways such for example, a bearing for a machine shaft, for a wheel, or for other similar purposes, and in other similar relations.

Broadly speaking, the invention resides in the provision of a bearing comprising an outer bearing member and an inner bearing member, said inner bearing member being free to rotate and to oscillate laterally within the said outer bearing, the shaft of course being passed through the inner bearing member and the said member being designed to rotate with the shaft.

In the accompanying drawings, Figure 1 is a view in side elevation and partly in section of the bearing embodying the invention. Fig. 2 is a vertical sectional view taken axially therethrough, and Fig. 3 is a detail edge view of one of the annular ball bearing receiving frames.

As shown in the drawings, the bearing embodying the invention is comprised in part of an outer annular bearing member which is indicated by the numeral 5, and which is formed with substantially V-shaped ball races 6, these races being formed in its inner peripheral surface and being located in parallel planes. The bearing further embodies an inner bearing member which is indicated by the numeral 7 and is also in the form of an annulus, it having a bearing surface 8 which is convex from side to side and at all points is defined by the arc of a circle having its center coincident with the axis of the inner bearing member 7. Ball bearings 9 are arranged one set within each of the ball races 6 and extend in a continuous series in the respective ball races and bear also against the transversely convex bearing surface of the inner bearing member 7, it being understood from the foregoing description and also from the drawings, and particularly Fig. 2 thereof, that the said inner member 7 is not only free to rotate within the said bearing member but is also free to oscillate laterally therein or with respect thereto.

Between the outer annular bearing member 5 and the inner bearing member 7, there are interposed two ball bearing confining frames each of which is comprised of integral annular spaced side portions 10 and connecting webs 11 which are equi-distantly spaced and which form, between the said side portions 10, an annular series of ball bearing receiving compartments, it being understood that one of the balls 9 is disposed within each compartment of each ball receiving frame, and that the webs 11 serve to separate the balls from contact one with another. As heretofore explained, the inner bearing member 7 is adapted to oscillate laterally with respect to the outer member 5 whereby to compensate for the non-alinement of the shaft supported by the bearing, with the axis of the bearing as an entirety, and in order to limit this oscillatory movement or play of the inner bearing member 7 with respect to the member 5, the said member 7 is formed in its bearing surface and at one side with an annular seat or groove 12 in which is removably seated or fitted a ring 13, it being understood that this ring, should the inner member 7 be oscillated to a considerable degree, contacts with the balls of the adjacent set and will prevent further oscillation of the set in the bearing member.

It will be understood that the V-shaped ball races lessen the friction between the bearing and the bearing surfaces of the races.

What is claimed is:—

1. In a bearing of the class described, an annular bearing member formed with ball races and an annular rib separating the races, an inner bearing member having a bearing surface which at all points is defined by the arc of a circle having its center coincident with the axis of the said inner member, balls within the ball races of the said outer member, the inner member being free to oscillate and rotate within the outer member, and an element carried removably upon the bearing surface of the inner member engageable with the balls in one race whereby to limit the oscillatory movement of the said inner member.

2. In a bearing of the class described, an annular bearing member formed of ball races and with a rib separating the races, an inner bearing member having a bearing surface which at all points is defined by the arc of a circle having its center coincident with the axis of the said inner member, annular frames arranged between the two members and having each a plurality of ball receiving compartments, balls within the said compartments, and seating in the races, the inner member being free to oscillate and to rotate within the outer member, and an element carried removably upon the bearing surface of the inner member and engageable with the balls in one race whereby to limit the oscillatory movement of the said inner member.

3. In a bearing of the class described, an annular bearing member formed with ball races and with an annular rib separating the races, an inner bearing member having a bearing surface which at all points is defined by the arc of a circle having its center coincident with the axis of the said inner member, integral annular frames arranged between the two members and having each a plurality of ball receiving compartments, balls confined one within each of said compartments and seating in the races, the inner member being free to oscillate and to rotate within the said outer member, and an element carried removably upon the bearing surface of the inner member and engageable with the balls in one race whereby to limit the oscillatory movement of the said inner member.

4. In a bearing of the class described, an outer annular bearing member formed with ball races, an inner bearing member having a bearing surface which at all points is defined by the arc of a circle having its center coincident with the axis of the said inner member, the said outer annular bearing member being formed also with an integral annular rib separating the ball races, annular frames arranged between the two members and having each a plurality of ball receiving compartments, balls within the said compartments and seating in the races, the inner member being free to oscillate and to rotate within the outer member, and an annular element seating in a groove in the bearing surface of the inner member and engageable with the balls in one race of the outer member whereby to limit the oscillatory movement of the inner member.

5. In a bearing of the class described, an outer annular bearing member formed with ball races and with an annular rib separating the races, an inner bearing member having a bearing surface which at all points is defined by the arc of a circle having its center coincident with the axis of the said inner member, annular frames arranged between the two members and having each a plurality of ball receiving compartments, balls within the said compartments and seating in the races, the inner member being free to oscillate and to rotate within the outer member, and a ring removably carried upon the bearing surface of the inner member and engageable with the balls in one race whereby to limit the oscillatory movement of the said inner member.

6. In a bearing of the class described, an annular bearing member formed with a ball race, an inner bearing member having a bearing surface which at all points is defined by the arc of a circle having its center coincident with the axis of the said inner member, balls within the ball race of the outer member, the inner member being free to rotate and oscillate within the outer member, and an annulus carried removably upon the bearing surface of the inner member and engageable with the balls whereby to limit the oscillatory movement of the said inner member.

In testimony that I claim the foregoing as my own, I have hereto affixed my signature in the presence of two witnesses.

OSCAR H. KARCHER.

Witnesses:
O. G. LAWRENCE,
EARL STONER.